United States Patent Office 3,519,600
Patented July 7, 1970

3,519,600
ROOM TEMPERATURE CURING ORGANO-
POLYSILOXANE ELASTOMERS
Kailash Chandra Pande, Adrian, Mich., and Richard
Eugene Ridenour, Sylvania, Ohio, assignors, by mesne
assignments, to Stauffer-Wacker Silicone Corporation,
a corporation of Delaware
No Drawing. Filed Feb. 3, 1966, Ser. No. 524,855
Int. Cl. C08f 11/04
U.S. Cl. 260—46.5                          4 Claims

ABSTRACT OF THE DISCLOSURE

Compositions convertible to the elastomeric state upon exposure to moisture are produced by reacting a silanol-terminated linear organopolysiloxane fluid with a 2,4,6,8-tetraalkyltetra(N,N-dialkylaminooxy)cyclotetrasiloxane.

This invention relates to preparations of essentially paste-like consistency which upon exposure to atmospheric moisture at normal temperatures become converted to a solid elastic state.

Such preparations are referred to in the art as room temperature vulcanizing (RTV) compositions and find utility, for example, in mold making, in coating operations and in the construction industry for caulking. They are commonly laid down as from a pot or a specially designed tube.

Preparations of the type herein fall into two categories. In the one case, the commercial package comprises two containers, one for the base composition, the other containing a catalyst which must be admixed with the base material to induce proper curing of the latter. Preparations of the second category do not require a catalyst, which is to say that when exposed to ambient moisture they are self-curing.

Compositions conforming to the present invention fit into the last described category and are distinguished in that they comprise as the moisture activated component an organopolysiloxane material according with the formula

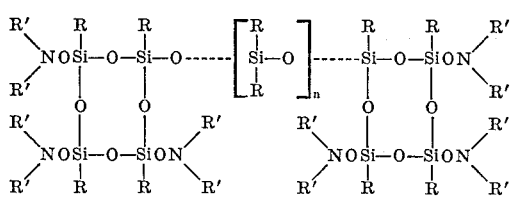

in which $n$ is an integer sufficient to yield a viscosity of from about 500 to about 500,000 centipoises, R is a monovalent hydrocarbon radical, preferably methyl, a halogenated monovalent hydrocarbon radical or a cyanoalkyl radical, and R' is H or an alkyl or halo-alkyl radical of not more than four carbon atoms. The R' groups may be the same or different.

In the practice of the invention, the organopolysiloxane material is generally prepared by reacting an hydroxy end-blocked organopolysiloxane fluid with a 2,4,6,8-tetraalkyltetra(N,N-dialkylaminooxy)cyclotetrasiloxane, these aminooxy compounds of themselves being novel:

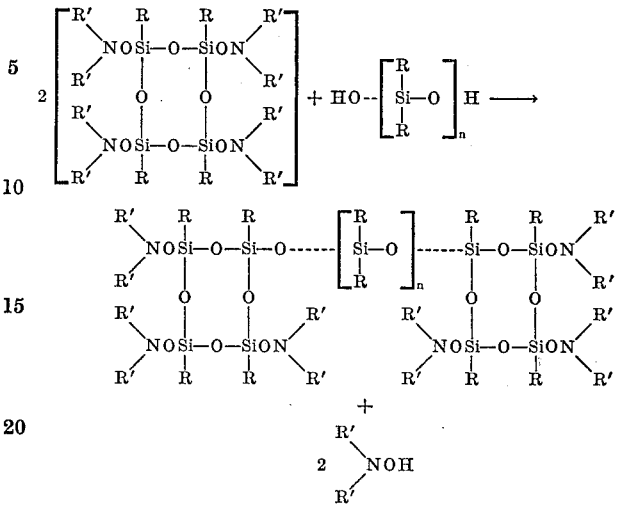

In this equation R and R' have the same significance as in the formula first appearing herein and $n$ is an integer of a value as demanded to achieve the viscosity requirement above indicated.

The 2,4,6,8-tetraalkyltetra(N,N-dialkylaminooxy)cyclotetrasiloxane may be derived as by reaction of the corresponding hydrogen-bearing cyclotetrasiloxane with a stoichiometric amount of a N,N-dialkylhydroxylamine containing the desired R' group or groups:

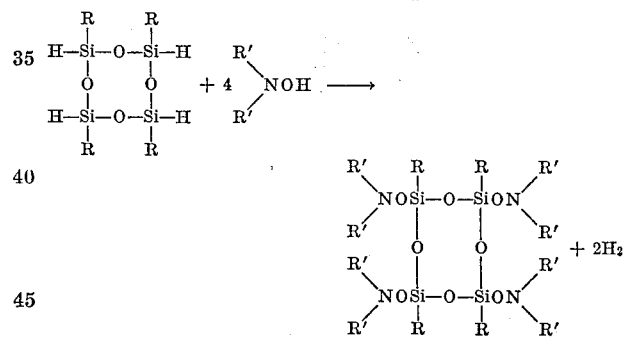

As indicated by the first equation above, the reaction involving the hydroxy end-blocked organopolysiloxane fluid and the (N,N-dialkylaminooxy)cyclotetrasiloxane demands by theory the use of at least 2 moles of the latter, but as a matter of practice it has been found that in some cases acceptable results can be achieved using as little as 1.6 moles of the (N,N-dialkylaminooxy)cyclotetrasiloxane per mole of hydroxy end-blocked fluid. In general, however, it is preferable to use the tetrasiloxane in excess, i.e. 2.5 to 4 moles per mole of hydroxy fluid, 2.5 moles being preferred. Both this reaction and the reaction immediately above, are best carried out in the presence of a solvent, heptane for example, and with constant stirring. An inert gas atmosphere e.g. nitrogen, is desirable to prevent premature moisture-activation of the reaction product with the consequent complications. Alternatively, an atmosphere of desiccated air can be used.

On the basis of the results of a large number of experiments, an hydroxy end-blocked fluid in which the organo substituents are methyl groups is preferred in the practice of the invention. As to the aminooxy substituents in the product material, diethylaminooxy is preferred.

As indicated by the viscosity range previously recited, the extent to which the hydroxy end-blocked organopolysiloxane material is polymerized varies widely. Thus $n$ in the type formula may have a value of as low as 5 (corresponding to a very thin fluid) or as high as 9,000 or more as obtains in the instance of extremely slow-flowing gums. Usally and preferably, the viscosity of the fluid lies within the range of 1,500 to 100,000 centipoises. Mixtures of high and low viscosity hydroxy end-blocked fluids are of course applicable to the invention. Moreover, it should be understood that the hydroxy end-blocked fluid employed may represent either a homopolymer of similar siloxane units or a copolymer of dissimilar units.

In some instances, it may be desirable to modify compositions conforming to the invention in order to achieve special properties. For example, to improve adhesiveness there may be incorporated in the composition a suitable amount of a resinous siloxane. In addition, these resinous siloxanes may be used to decrease the elasticity of the cured composition, which in some cases is a desideratum. Plasticization of the vulcanized compositions, where necessary or desirable, can be achieved using various materials, including trimethyl end-blocked dimethyl siloxanes.

Although the compositions herein can often be applied per se with good effect, they are of greatest commercial interest at present as applied in admixture with various fillers. These may be reinforcing or non-reinforcing, fibrous or non-fibrous. In general, substantially any of the fillers employed in the compounding of silicone rubbers may be used in the practice of the invention. As exemplary of reinforcing fillers may be mentioned: fumed silicas, high-surface area precipitated silicas, silica aerogels and the like. The coarser silicas, as diatomaceous earths and crushed quartz, are examples of non-reinforcing filler materials having application to the invention. In this connection, metallic oxides as titanium oxide, ferric oxide, zinc oxide, etc. also should be noted. Applicable fibrous fillers include asbestos and fibrous glass.

Considering the effect of moisture on the compositions herein, it is manifestly important that the filler material be dry before use for the purposes of the invention. The quantity of filler employed depends on the nature of the particular filler and the properties desired in the final product. In most cases where a filler is used, the same is applied in an amount representing about 40 to about 80 parts by weight, most frequently 50–70 parts by weight, per 100 parts of the organopolysiloxane material.

Where the composition is to be used in caulking, care should be exercised to select a filler which will preclude any tendency of the composition to slump during application or thereafter. The term "slump," of course, refers to gravity-induced flow of such a material with resultant development of areas of non-uniform section.

Apart from fillers as before mentioned, compositions conforming to the invention may contain coloring agents, agents capable of preventing the passage of ultraviolet light, desiccants and antioxidants, for instance. Also, depending upon the use to which the composition is to be put, it may or may not be desirable or necessary to include a dielectric material, graphite for example.

As hereinbefore suggested, compositions conforming to the invention can be tailored to fit variously specifications as to cure times. In caulking, for instance, the working time from the pot is more or less conventionally calculated as of the order of 2–2½ hours. Thus to meet this requirement, the starting materials used in the preparation of the composition are so selected that substantial stiffening of the composition will not occur until after expiration of such period of time. Normally, the applied material is tack-free within ¼ to 3 hours, is substantially cured after 24 hours and completely cured after 7 days. These periods, of course, vary somewhat as to any given composition with changes in humidity and also with changes in temperature. In general, the higher the temperature and humidity the faster the cure.

The compositions herein, assuming proper packaging, show an excellent shelf-life, which is to say that they can be stored for prolonged periods of time without adverse effect.

Normally, the moisture activation of the composition as it is laid down occurs through the influence of the moisture in the ambient air at the work site, but extraneous water vapor may be supplied by any suitable means to hasten the cure where and when desirable. It would appear that the curing process proceeds with cross-linking of the organopolysiloxane polymer units as illustrated below:

I.

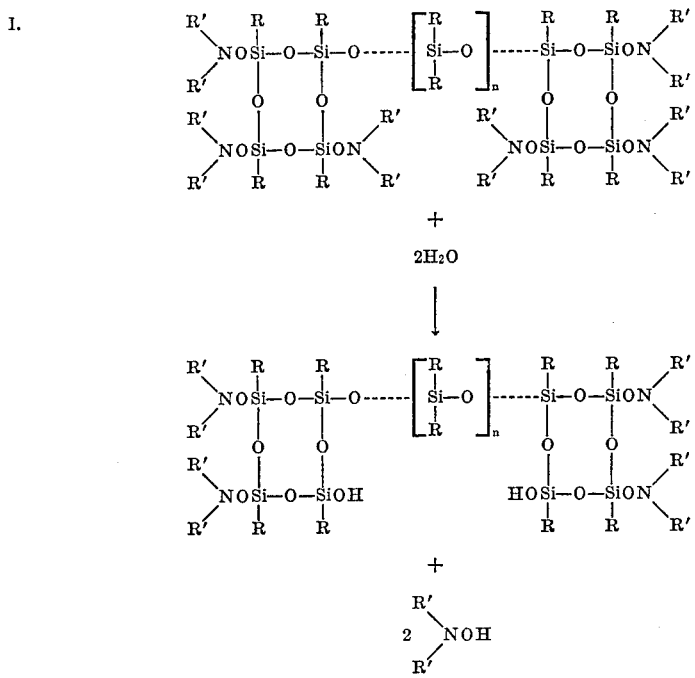

II. 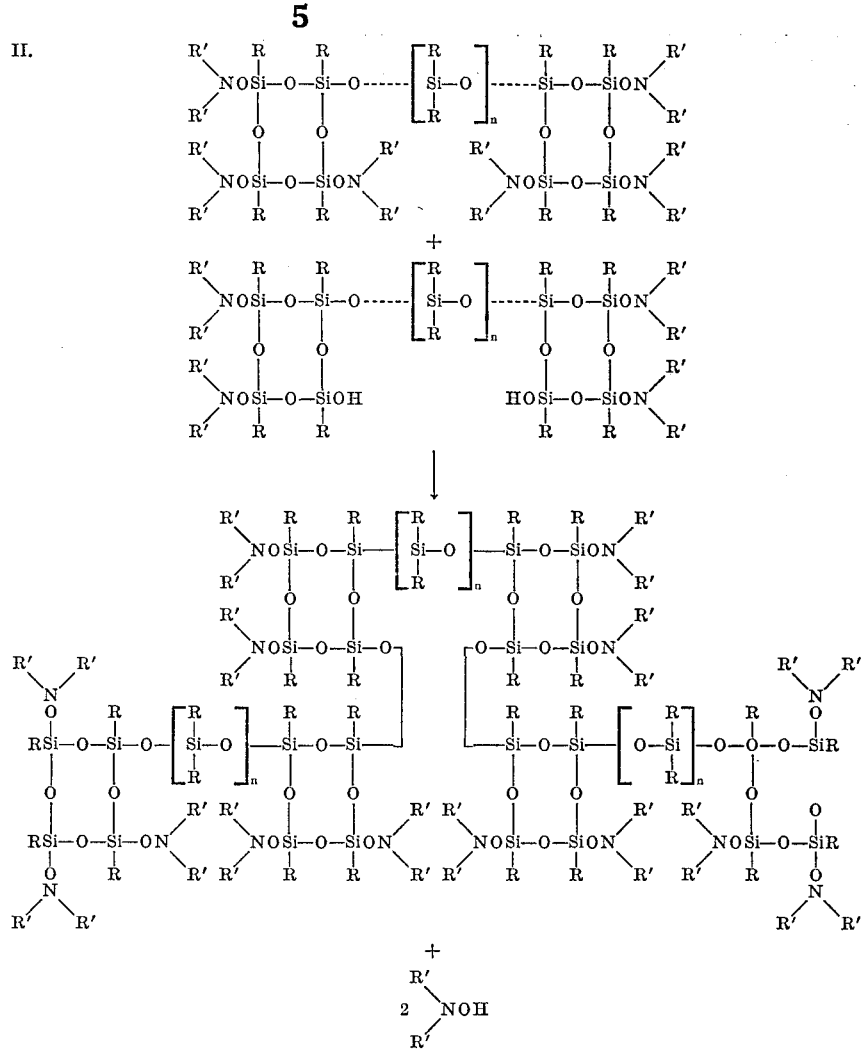

The cross-linked structure is, of course, subject to further cross-linking through hydrolysis of one or more of its aminooxy groups.

The invention is further illustrated by the following examples which are not to be taken as in any way limitative thereof:

EXAMPLE I

A mixture of 12 gm. (0.05 mole) of 2,4,6,8-tetramethylcyclotetrasiloxane in 50 ml. of anhydrous pentane, was placed in a 100 ml. 3-neck flask fitted with a nitrogen inlet, reflux condenser, and serum stopper.

Through the serum stopper, via a syringe, was added 18 gm. (0.02 moles) of diethylhydroxylamine over a period of one-half hour.

Hydrogen gas was observed bubbling from the reaction mixture which was maintained for 12 hours at room temperature under constant stirring. Thereafter, the pentane was stripped in vacuo. The product was found to be (N.M.R., I.R.) 2,4,6,8 - tetramethyltetra(N,N - diethylaminooxy)cyclotetrasiloxane.

EXAMPLE II

Into a small resin flask, fitted with a wire stirrer, serum stopper and nitrogen inlet, was introduced 57.6 gm. of hydroxyl end-blocked dimethylpolysiloxane fluid of approximate molecular weight: 14,400. To this was added, through the serum stopper, via a syringe, 5.9 gm. (0.01 mole) of 2,4,6,8 - tetramethyltetra(N,N-diethylaminooxy)cyclotetrasiloxane.

After stirring for one hour at 100° C., the polymer was stripped in vacuuo of solvent, excess end-blocker and N,N-diethylhydroxylamine and stored in a sealed tube.

This material when exposed to the air (25° C., 50% rel. humid.) cured to a tack-free elastomer in 15 minutes. Total cure occurred within three days.

EXAMPLE III

Using the same procedure as in Example II, 44 gm. of hydroxy-organopolysiloxane fluid of approximately 8,800 molecular weight was milled with 4.4 gm. of silicate filler (Organ-O-Sil S-5) and thereafter reacted with 7.4 gm. (0.0125 mole of 2,4,6,8 - tetramethyltetra(N,N - diethylaminooxy)cyclotetrasiloxane.

The product material cured to a rubbery solid at room temperature (50% rel. humid.) in 15 minutes.

What is claimed is:

1. An organopolysiloxane material stable under anhydrous conditions which conforms to the formula

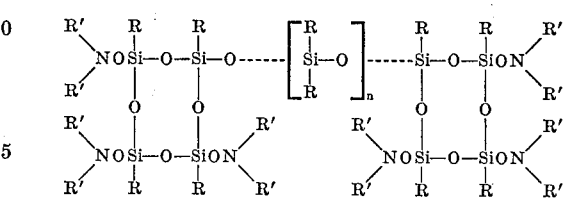

in which $n$ is an integer sufficient to yield a viscosity of from about 500 to about 500,000 centipoises, R is selected from the class consisting of monovalent hydrocarbon, halo-hydrocarbon and cyano-alkyl radicals and R' is H or an alkyl or halo-alkyl radical of not more than 4 carbon atoms.

2. An organopolysiloxane material conforming to claim 1 where each R is methyl.

3. An organopolysiloxane material conforming to claim 2 where each R' is ethyl.

4. An organopolysiloxane material conforming to claim 2 where $n$ has a value of between 5 and about 9,000.

References Cited

UNITED STATES PATENTS

| | | | |
|---|---|---|---|
| 3,318,898 | 5/1967 | Boissieras et al. | 260—46.5 |
| 3,341,486 | 9/1967 | Murphy | 260—46.5 |
| 3,359,237 | 12/1967 | Boissieras et al. | 260—46.5 |

DONALD E. CZAJA, Primary Examiner

M. I. MARQUIS, Assistant Examiner

U.S. Cl. X.R.

260—37, 448.2